US012717350B2

(12) United States Patent
Wright

(10) Patent No.: US 12,717,350 B2
(45) Date of Patent: Aug. 25, 2026

(54) METHODS AND SYSTEMS FOR PNEUMATIC TUBE PAYLOAD EXCHANGE, DRONE INTERACTION, AND PAYLOAD DELIVERY

(71) Applicant: CVS Pharmacy, Inc., Woonsocket, RI (US)

(72) Inventor: Joshua Wright, Auburn, MA (US)

(73) Assignee: CVS Pharmacy, Inc., Woonsocket, RI (US)

(*) Notice: Subject to any disclaimer, the term of this patent is extended or adjusted under 35 U.S.C. 154(b) by 209 days.

(21) Appl. No.: 18/613,741

(22) Filed: Mar. 22, 2024

(65) Prior Publication Data

US 2024/0411324 A1 Dec. 12, 2024

Related U.S. Application Data

(60) Provisional application No. 63/454,020, filed on Mar. 22, 2023.

(51) Int. Cl.

| | |
|---|---|
| ***B64U 10/13*** | (2023.01) |
| ***B25J 9/02*** | (2006.01) |
| ***B64D 1/22*** | (2006.01) |
| ***B64U 10/14*** | (2023.01) |
| ***B64U 20/70*** | (2023.01) |
| ***B64U 80/25*** | (2023.01) |
| ***G05D 1/667*** | (2024.01) |
| ***G16Y 40/60*** | (2020.01) |
| *B64U 101/60* | (2023.01) |
| *G05D 105/20* | (2024.01) |
| *G05D 109/10* | (2024.01) |

(Continued)

(52) U.S. Cl.

CPC .............. *G05D 1/667* (2024.01); *B25J 9/026* (2013.01); *B64D 1/22* (2013.01); *B64U 20/70* (2023.01); *G16Y 40/60* (2020.01); *B64U 2101/60* (2023.01); *G05D 2105/20* (2024.01); *G05D 2109/10* (2024.01); *G05D 2109/20* (2024.01); *G05D 2111/30* (2024.01)

(58) Field of Classification Search

CPC ............... G05D 1/667; G05D 2111/30; G05D 2109/20; G05D 2109/10; G05D 2105/20; G16Y 40/60; B64U 20/70; B64U 2101/60; B25J 9/026; B64D 1/22

See application file for complete search history.

(56) References Cited

U.S. PATENT DOCUMENTS

| | | | | |
|---|---|---|---|---|
| 2016/0257423 A1* | 9/2016 | Martin | .................. | A47G 29/14 |
| 2017/0011340 A1* | 1/2017 | Gabbai | .................. | G05D 1/667 |
| 2017/0137124 A1* | 5/2017 | Walker | .................. | G08B 25/08 |

(Continued)

FOREIGN PATENT DOCUMENTS

| | | | | |
|---|---|---|---|---|
| AU | 2020294312 A1 * | 7/2021 | ............. | G16H 20/13 |

*Primary Examiner* — Scott A Browne
*Assistant Examiner* — Rami Nabih Bedewi
(74) *Attorney, Agent, or Firm* — Sheridan Ross PC

(57) ABSTRACT

A drone delivery system and network includes host sites that are geographically arranged in a region having overlapping drone delivery ranges. A central flight server of the system determines delivery flight paths for a drone transporting a payload from an originating host site to another host site or a target site in the network. The flight range of the drone is extended based on a delivery type for the payload and a distance of the target site from the originating host site.

18 Claims, 11 Drawing Sheets

(51) Int. Cl.
*G05D 109/20* (2024.01)
*G05D 111/30* (2024.01)

(56) References Cited

U.S. PATENT DOCUMENTS

2022/0017222 A1* 1/2022 Benner .................. B64U 80/25
2022/0315222 A1* 10/2022 Gil .......................... B64C 25/34
2022/0315246 A1* 10/2022 Gil ......................... B64U 10/13
2023/0363562 A1* 11/2023 O'Toole ............... G06K 7/1413

* cited by examiner

| Host Site | Target Site | Delivery Flight Path | Delivery Indication | Range Extension Type at Location |
|---|---|---|---|---|
| H1 | T1 | H1-T1 | Rush | N/A |
| H1 | T2 | H1-T2 | Standard | N/A |
| H1 | T3 | H1-H2-T3 | Standard | FC: H2 |
| H1 | T4 | H1-H2-H3-H4-T4 | Rush | X: H2, H3, H4 |
| H1 | T5 | H1-H2-H3-H4-H5-H6-T5 | *SECURE* | PE: H2, H3, H4, H5, H6 |
| H1 | T6 | H1-H2-H3-H4-H5-H6-H7-H8-T6 | Economy | C: H2, H3, H4, H5; X: H6, H7; FC: H8 |

METHODS AND SYSTEMS FOR PNEUMATIC TUBE PAYLOAD EXCHANGE, DRONE INTERACTION, AND PAYLOAD DELIVERY

CROSS-REFERENCE TO RELATED APPLICATIONS

The present application claims the benefit of and priority, under 35 U.S.C. § 119(e), to U.S. Provisional Application Ser. No. 63/454,020, filed on Mar. 22, 2023, entitled "METHODS AND SYSTEMS FOR PNEUMATIC TUBE PAYLOAD EXCHANGE, DRONE INTERACTION, AND PAYLOAD DELIVERY," the entire disclosure of which is hereby incorporated herein by reference, in its entirety, for all that it teaches and for all purposes.

BACKGROUND

The present disclosure is generally directed to delivery systems, in particular, toward the hands-free delivery of payloads to target sites or customers by drone.

Hands-free delivery has increasingly become a popular delivery method for payloads of assorted sizes. Companies are continually trying to improve the range, reliability, safety, and timing associated with their product deliveries. These improvements even include the companies creating a private delivery infrastructure that operates with or without the use of traditional postal or publicly available carrier services.

BRIEF SUMMARY

With respect to the delivery of medicine, medication, and medicaments, such as prescription drugs, antidotes, anti-overdose medicine, etc., the safety and timing associated with the delivery is of paramount importance. For example, when delivering an anti-overdose medicine to a patient in the field, any delay in the delivery of the medicine can have severe consequences for the health of the patient. As another example, some people living in remote areas may not have access to fast or reliable delivery for their medication. In this example, traditional delivery methods fail. As yet another example, some people who may be traveling or are on vacation, and have run out of, or lost, their medication, may not be able to provide a delivery address to receive an urgent replacement. It is with respect to the above issues and other problems that the examples presented herein were contemplated.

The present disclosure provides a drone delivery system and network that is capable of interfacing with a pneumatic tube payload handling and transport systems for delivery. In some examples, the drone delivery system utilizes a drone mesh network that includes, as its nodes, a plurality of drone host sites. The drone host sites may correspond to the physical location of a building, platform, or other structure, that receives a drone (e.g., when landing and/or taking off, etc.), charges a drone, stores a drone, interfaces with a drone (e.g., transferring a payload to and/or from the drone), serves as the source site (e.g., store) of a payload for delivery by the drone, combinations thereof, and/or the like. In one example, the drone host sites may correspond to a building or other physical asset owned, or leased, by a retail company who provides a product, service, and/or combination thereof for delivery by drone to their clients. These physical assets may be referred to herein as drone assets.

A drone mesh network may be created using overlapping properties, or ranges, as landing, delivery, and/or takeoff locations to extend the range of the delivery drone. The drones may interface with people inside buildings using a new pneumatic tube interface for both sending and receiving cargo shuttle tubes. The receiving interface can be applied to either external or built-in gravity based systems at residential locations, retail locations, or other dedicated drop-off locations.

The drone network may be managed by a central flight center within current licensing and Federal Aviation Administration ("FAA") and/or Department of Defense (DOD) flight regulations. The drones and/or drone network may include experimental and/or non-experimental aircraft, devices, services, flights, designations, certifications, and/or the like.

As described herein, the interface for exchanging the cargo shuttle tubes with a host or delivery site may minimize drone-human interaction, protecting both. Landing and/or takeoff locations may be designed to be sound suppressing. For instance, noise cancelling drone props and cut wing props may be employed by the drones to, among other things, reduce operational noise inflight and during takeoff and/or landing situations.

In some examples, the drone delivery system and network may provide a number of advantages that are not available to conventional delivery methods and systems. For example, the drone delivery system and network of the present disclosure may provide an emergency medicine and/or community response function that is capable of delivering life-saving medicines, medical equipment, and/or other products (e.g., Narcan, Insulin, Epinephrine, and/or a defibrillator, etc.) to nearly anywhere in a drone mesh network supported community in a short amount of time including, but in no way limited to, a total delivery time of 3 minutes or less.

The drone delivery examples disclosed herein create a scalable mesh network of interconnected shuttle and relay locations. Takeoff, delivery, and landing of drones and cargo leverage overlapping coverage areas to maximize existing and new technology and resources. The safe and carbon neutral interface between humans and drone operations offers additional benefits to the drone delivery system and network. Each portion of the delivery system, as a whole, may be modular and, as such, can scale both up and down as network and end users demands change.

In one aspect, a drone delivery system includes a drone including a body and a frame that supports a plurality of rotors, a power compartment disposed in the body, the power compartment supporting a battery that provides power to each rotor of the plurality of rotors, and a payload receptacle that is configured to receive and hold a payload during flight, a host site including a payload capture system that loads the payload into the payload receptacle of the drone, where the payload capture system includes a receiver funnel body that arranges the payload for loading into the drone, and a central flight server that communicates wirelessly with the drone and automatically directs a delivery of the payload by the drone from the host site to at least one target site that is remotely located apart from the host site.

Aspects of the above system may include a pneumatic tube system that conveys the payload from an interior space of the host site to the receiver funnel body arranged on an exterior space of the host site. Aspects of the above system may include where the pneumatic tube system is configured to convey a received payload from the receiver funnel body arranged on the exterior space of the host site to the interior space of the host site via at least one delivery pipe. Aspects of the above system may include where the payload includes a cargo shuttle tube, and where the cargo shuttle tube comprises a communication tag (e.g., radio frequency identification tag, etc.) attached to a body of the cargo shuttle tube.

All examples and features mentioned above can be combined in any technically possible way.

The preceding is a simplified summary of the disclosure to provide an understanding of some aspects of the disclosure. This summary is neither an extensive nor exhaustive overview of the disclosure and its various aspects, embodiments, examples, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, examples, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, examples, and configurations of the disclosure, as illustrated by the drawings referenced below.

DETAILED DESCRIPTION

Figure 1:
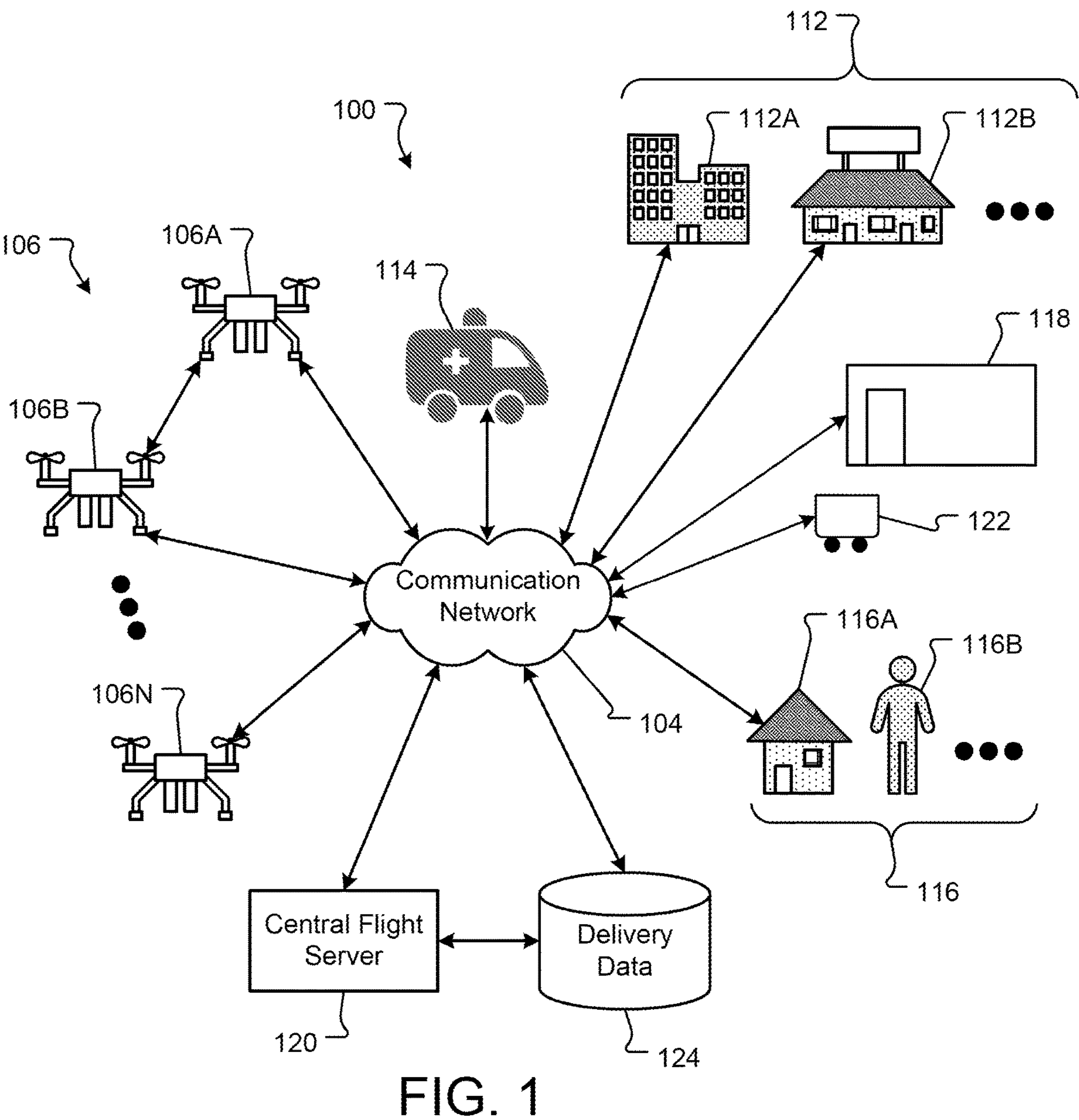
FIG. 1 shows a block diagram of a drone delivery system and network in accordance with examples of the present disclosure.

Before any examples of the disclosure are explained, it is to be understood that the disclosure is not limited in its application to the details of construction and the arrangement of components set forth in the following description or illustrated in the drawings. The disclosure is capable of other examples and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides examples only, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims.

Various aspects of the present disclosure will be described herein with reference to drawings that may be schematic illustrations of idealized configurations.

Referring now to FIG. 1, a block diagram of a drone delivery system and network 100 is shown in accordance with examples of the present disclosure. The drone delivery system and network 100 may include one or more of a plurality of drones 106, host sites 112, and target sites 116. The drones 106 may correspond to unmanned aerial vehicles that are capable of delivering a payload from one point to another. In some examples, the drones 106 may correspond to fixed wing flying machines, rotary blade flying machines (e.g., single rotor, tricopters, quadcopters, hexacopters, octocopters, etc.), and/or vertical take-off and landing ("VTOL") flying machines.

The drones 106 may be controlled by a central flight server 120 sending control instructions across the communication network 104 to drones 106. The central flight server 120 may utilize information stored in the delivery data memory 124 (e.g., memory storage device, database, etc.) to, among other things, control movements, programming, updating, information transfer, and/or the like between the central flight server 120 and the drones 106. In some examples, the drones 106 may communicate directly with one another in a mesh network. For instance, a first drone 106A may receive instructions from the central flight server 120 over the communication network 104. These instructions may include information for a second drone 106B in the drone delivery system and network 100. The first drone 106A may then relay the information to the second drone 106B, when the second drone 106B is in proximity to the first drone 106A, via a wireless communication between the first drone 106A and the second drone 106B. The drone delivery system and network 100 may include, or recruit, any number of available drones 106A-106N in making deliveries.

The central flight server 120 may include, or correspond to, a processor. The processor may correspond to one or more computer processing devices. For example, the processor may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some examples, the processor may be provided as a Central Processing Unit ("CPU"), a microprocessor, or a plurality of microprocessors that are configured to execute instructions sets stored in a memory of the central flight server 120 and/or the delivery data memory 124. Upon executing the instruction sets stored in the memory, the processor enables various communications, flight functions, payload pickup functions, payload drop-off functions, take-off functions, landing functions, and/or interaction functions of the drones 106, and may provide an ability to establish and maintain communications between the drones 106 over the communication network 104 when specific predefined conditions are met. The processor may be embodied as a virtual processor(s) executing on one or more physical processors. The execution of a virtual processor may be distributed over a number of physical processors or one physical processor may execute one or more virtual processors. Virtual processors are presented to a process as a physical processor for the execution of the process while the specific underlying physical processor(s) may be dynamically allocated before or during the execution of the virtual processor wherein the instruction stack and pointer, register contents, and/or other values maintained by the virtual processor for the execution of the process are transferred to another physical processor(s). As a benefit, the physical processors may be added, removed, or reallocated without affecting the virtual processors execution of the processes. For example, the processor may be one of a number of virtual processors executing on a number of physical processors (e.g., "cloud," "farm," array, etc.) and presented to the processes herein as a dedicated processor. Additionally, or alternatively, the physical processor(s) may execute a virtual processor to provide an alternative instruction set as compared to the instruction set of the virtual processor (e.g., an "emulator," etc.).

The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol ("IP") network consisting of many computers, computing networks, and other communication devices located all over the world, which are connected through many telephone systems and other means. Other examples of the communication network 104 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a VoIP network, a cellular network, a satellite communication network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, optical/infrared, and combinations thereof.

The delivery data memory 124, or storage memory, may correspond to any type of non-transitory computer-readable medium. In some examples, the delivery data memory 124 may comprise volatile or non-volatile memory and a controller for the same. Non-limiting examples of the storage memory 124 that may be utilized by the central flight server 120 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The delivery data memory 124 may be used to store information about flight paths, host sites, target sites, delivery types, ranges of drones, timing, map data, and/or the like. In some examples, the delivery data memory 124 may be configured to store rules and/or instruction sets in addition to temporarily storing data for the central flight server 120 to execute various types of routines or functions. In some examples, the delivery data memory 124 or the data stored therein may be stored internal to the central flight server 120, rather than in a separate database, or in a separate server.

The host sites 112 may correspond to stores, retail locations, structures, and/or properties that are owned, or leased, by a company utilizing the drone delivery system and network 100. In one example, the company may correspond to a health solutions company having a specific number of physical retail stores and/or pharmacies geographically distributed about a region. The retail stores and/or pharmacies may correspond to the host sites 112 shown in FIG. 1. Examples of the capabilities provided by the host sites 112 include, but are in no way limited to, drone charging, payload exchange (e.g., drop-off, pickup, adjustment, weather protection, etc.), power exchange (e.g., battery exchange, fuel-cell replacement, etc.), drone swapping, drone storage, combinations thereof, and/or the like. At least some of the host sites 112 may serve as the source of a payload, such as a product provided, rented, or sold, by the company. In the case of the health solutions company example above, the product may correspond to a medication, prescription, medicament, vitamin, medical devices (e.g., defibrillator, nebulizer, oxygen tank, etc.), or combinations thereof, provided by the company. In some examples, a drone 106 may pick up a payload from a store (e.g., the second host site 112B), travel to a building (e.g., the first host site 112A) where the drone 106 can charge, and then proceed to deliver the payload to a residential building (e.g., first target site 116A).

The target sites 116 may correspond to homes, vehicles, locations, structures, and/or properties that are associated with a person, customer, company, client of the company, internal delivery waypoint, and/or delivery endpoint that participates in or uses the drone delivery system and network 100. Continuing the example above, where the company is a health solutions company, the payload may be delivered from a store (e.g., second host site 112B) to a residential address (e.g., the first target site 116A) or a location (e.g., second target site 116B) that is associated with the client of the health solutions company. In some examples, a client may be remotely located away from a home or business and the drone 106 may deliver a payload to the client at their current location. The current location may be based on a geographical location of a smartphone or other communication device owned by the client. In some examples, the drone 106 may communicate across the communication network 104 with the communication device of a client to deliver to the client who is remotely located. At least one advantage to this approach includes the ability to reach clients while the client is traveling or is away from home. For instance, a client who is on a boat, may require a delivery of a prescription drug while out to sea. In this case, the drone 106 may communicate with the smartphone of the client to determine precise Global Positioning System ("GPS"), or relative, coordinates associated with the client and make the delivery of the prescription drug to the coordinates.

According to one embodiment, other one or more target sites can include a current geographic location of Emergency Medical Services (EMS) personnel 114 or other first responders. For example, the central flight server may obtain the current geographic location of the EMS personnel 114 from a GPS receiver in or on an emergency vehicle from which a request to dispatch medicine, medical equipment, medical supplies, etc. is received. In other cases, such a request may be received from a dispatching system (not shown here) used by and supporting the EMS and/or other first responder services. In this way, medicines, medical equipment, medical supplies, etc. that are in urgent need can be rapidly dispatched to the site of an emergency situation, potentially saving lives. For example, Narcan quickly dispatched to paramedics or police at the site of an overdose. In another example, an AED can be sent to the location of a patient suffering a cardiac arrest if one is not otherwise available to first responders on site.

According to another embodiment, a target site can comprise a current geographic location of a private citizen, i.e., a person other than EMS or first responder personnel. In this example, a person or a digital device like a smart phone on behalf of the person could indicate an emergency call and request emergency drone response. For instance, if a user of a smart watch or other device were to collapse due to a heart attack, the smart watch or other device could detect the heart status and fall and call for a response. In other cases, a person other than EMS or first responder personnel witnessing a medical emergency may click a button or otherwise initiate a request in an app executing on a smartphone or other mobile device to request Narcan, a defibrillator, or other medical equipment or supplies to their current location.

According to yet another embodiment, other one or more target locations can comprise a parcel pod 118. Generally speaking, the parcel pod 118 can comprise a relatively small, building-like structure roughly the size of a trailer or shipping container. The parcel pod 118 can be located in an area which, for example, because of remoteness or other factors, is not otherwise conveniently served by a pharmacy or similar retail facility. The parcel pod can be equipped to receive payloads from drones, sort the payloads, and store the payloads. The payloads can then be picked up by an intended recipient. In other cases, the payloads may be loaded into a last mile delivery robot 122 to another target location 116 such as a home or business under direction and control of the central flight server. Additional details of exemplary parcel pods 118 and last mile delivery robots 122 will be described below with reference to FIGS. 9A-9C.

Figures 2A, 2B:
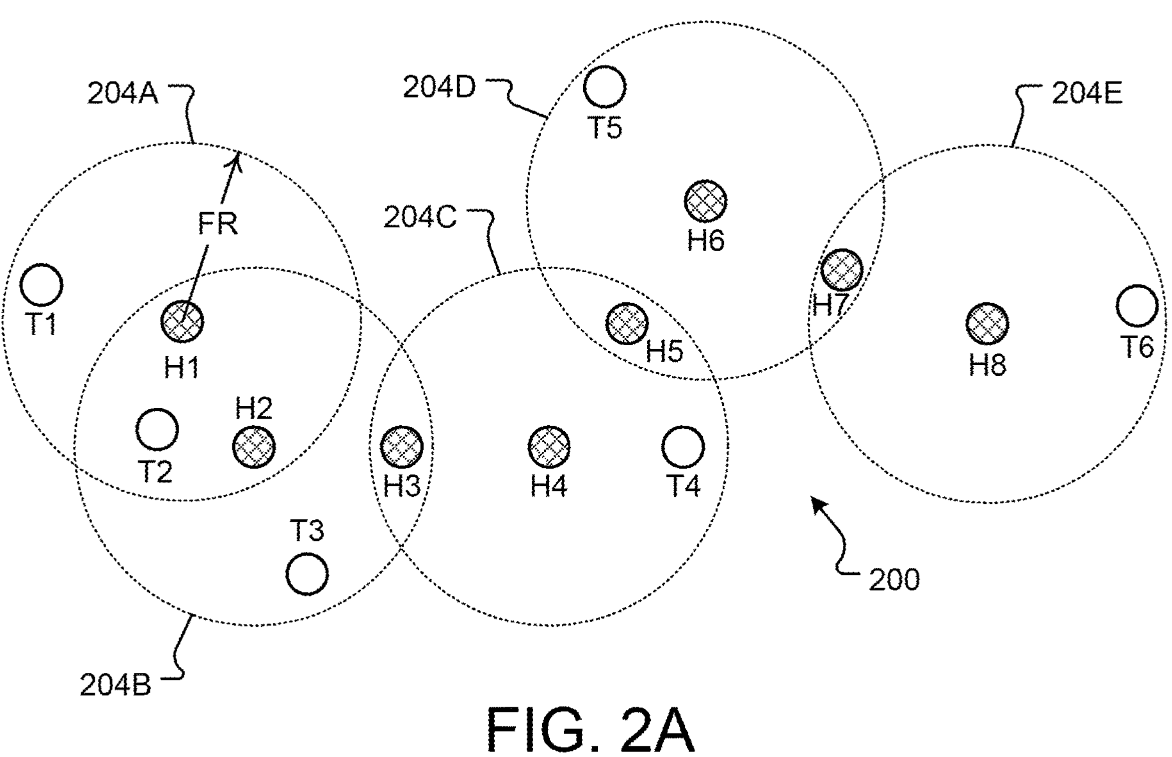
FIG. 2A shows schematic diagram of a drone delivery mesh network in accordance with examples of the present disclosure.
FIG. 2B shows a data structure of delivery flight paths between host sites and target sites in the drone delivery system and network in accordance with examples of the present disclosure.

FIG. 2A shows schematic diagram of a drone delivery mesh network 200 in accordance with examples of the present disclosure. FIG. 2B shows a data structure of example delivery flight paths between host sites and target sites shown in the schematic drone delivery mesh network 200. Each row of the data structure shown in FIG. 2B will be described with respect to the schematic drone delivery mesh network 200 shown in FIG. 2A.

The schematic drone delivery mesh network 200 may correspond to a node diagram including a plurality of nodes representing host sites H1-H8 (e.g., host sites 112) in the drone delivery system and network 100, a plurality of nodes representing target sites T1-T6 (e.g., target sites 116) in the drone delivery system and network 100, and overlapping drone ranges 204A-204E for drones 106 in the drone delivery system and network 100. Each drone range 204A-204E represents a flight range, or nominal flight limit, of a drone 106 at a respective host site H1, H2, H4, H6, and H8. In some examples, the drone ranges 204A-204E may correspond to a furthest distance, measured as the first radius, FR, from the center of a respective originating node, that a drone 106 can fly from the originating node (e.g., under predetermined conditions such as crosswinds, temperature, time of day, weather, etc.) before the drone 106 needs to return to the originating node or find an alternative node to refuel. While the host sites H1-H8 (e.g., host sites 112) have been described above as having certain capabilities, it should be appreciated that the target sites T1-T6 (e.g., target sites 116) may have the same, or similar, capabilities. For instance, at least some capabilities provided by the target sites T1-T6 (e.g., target sites 116) may include, but are in no way limited to, drone charging, payload exchange (e.g., drop-off, pickup, adjustment, weather protection, etc.), power exchange (e.g., battery exchange, fuel-cell replacement, etc.), drone swapping, drone storage, combinations thereof, and/or the like. In some examples, the pickup at the target sites T1-T6 may include a sealed bodily fluid sample (e.g., blood, urine, etc.) provided by a client, an empty pill bottle, a payment, a response to a questionnaire, etc.

The data structure of FIG. 2B corresponds to information that may be associated with potential deliveries made, or to be made, in the drone delivery system and network 100. Although shown as including deliveries by drone 106 from the first host site, H1, to a number of target sites T1-T6, the data structure may include data for deliveries by drone 106 from any of the host sites H1-H8 to any of the target sites T1-T6 in the schematic drone delivery mesh network 200. Among other things, the data structure of FIG. 2B demonstrates various flight paths (e.g., by linked node hops), delivery types (e.g., by identification), and any range extensions required (e.g., transfer of payload to another drone, charging, battery replacement, etc.).

The data structure is arranged as a chart, for discussion purposes, but may have an alternative arrangement without departing from, or limiting, the scope of the disclosure. The first column includes host sites 112 identified by number (e.g., H1 for the first host site, H2 for the second host site, and so on) that correspond to the source, or origination, of the payload for delivery in the drone delivery system and network 100. The second column includes target sites 116 identified by number (e.g., T1 for the first target site, T2 for the second target site, and so on) that correspond to the delivery destination, or target, for a particular delivery from the host site 112 identified in the first column. The third column in the chart includes node-to-node delivery flight paths for the delivery of the payload from the host site 112 identified to the target site 116 identified. The nodes (e.g., host sites H1-H8, target sites T1-T6, etc.) listed in the delivery flight path may correspond to waypoints that the drone 106 follows in making a delivery. The fourth column includes information that identifies a type of the delivery. The type of the delivery may define an urgency, or timing, that can be used by the central flight server 120 to determine a best delivery flight path and/or host site H1-H8 for a payload to be delivered to a target site T1-T6, and/or select a range extension type at one or more nodes along the delivery flight path. The fifth column may include information that defines whether a particular range extension is required for a drone 106 to reach a destination (e.g., target site 116). If a range extension is required, the type of range extension may be determined based on the type of the delivery and/or other factors.

In the first row of the chart shown in FIG. 2B, a first delivery is defined as originating at the first host site, H1, with a destination at the first target site, T1. As illustrated in the schematic drone delivery mesh network 200 of FIG. 2A, the first target site, T1, is within the first drone range 204A of the first host site, H1. In this example, the delivery flight path may be direct from the first host site, H1, to the first target site, T1, represented by the node link H1-T1. The delivery type is indicated as being a rush delivery, which means that any unnecessary delays in the delivery are to be avoided. Since the first target site, T1, is within the first drone range 204A of the drone 106 at the first host site, H1, there is no range extension required for the drone 106 in this example.

The second row shows a second delivery from the first host site, H1, to the second target site, T2, in the schematic drone delivery mesh network 200. As shown in the schematic drone delivery mesh network 200 of FIG. 2A, the second target site, T2, is within the first drone range 204A of the first host site, H1. In this example, a drone 106 flying from the first host site, H1, to the first target site, T1, may be direct and represented by the node link expression H1-T2. The delivery type is indicated as being a standard delivery, which means that some delay associated with the delivery may be acceptable but that further delay may not be unacceptable. Similar to the first delivery, since the second target site, T2, is within the first drone range 204A of the drone 106 at the first host site, H1, there is no range extension required for the drone 106 in this example.

The third row shows a delivery from the first host site, H1, to a target site 116 that is outside of the first drone range 204A of the drone 106 at the first host site, H1. In particular, the third target site, T3, is within the second drone range 204B of the second host site, H2, but is outside of the first drone range 204A of the first host site, H1. In this case, the drone 106 may be required to travel from the first host site, H1, to the second host site, H2, before the delivery can be made to the third target site, T3. Since the delivery type is indicated as standard, the drone 106 traveling from the first host site, H1, to the second host site, H2, may be able to undergo a charge before reaching the third target site, T3. Since charging of a battery of the drone 106 includes a charge time, a limited delay in the delivery to the third target site, T3, may be incurred. As shown in the fifth column, the letters "FC" indicating "Fast Charge" is performed at second host site, H2, thereby increasing the range of the drone 106 making the delivery to third target site, T3.

The fourth row includes information for a delivery made from the first host site, H1, to the fourth target site, T4. In this example, the delivery type is indicated as a rush delivery. Since unnecessary delays are to be avoided with a rush delivery, the drone 106 may transfer the payload to another drone (e.g., that is fully charged or fueled) at one or more of the waypoints along the delivery flight path. The delivery flight path is determined as originating at the first host site, H1, traveling to the second host site, H2, then the third host site, H3, and then the fourth host site, H4, before reaching the fourth target site, T4. In this example, because the delivery type is indicated as rush, the payload may be required to be transferred (e.g., identified as range extension "X" in the fifth column) from the drone 106 to a first subsequent drone 106 at second host site, H2, then to a second subsequent drone 106 at the third host site, H3, and then to a third subsequent drone 106 at the fourth host site, H4, before the payload is delivered to the fourth target site, T4.

The fifth row includes information for a delivery made from the first host site, H1, to the fifth target site, T5, in the schematic drone delivery mesh network 200. In this example, the delivery type is indicated as a "secure" delivery. A secure delivery may require that a payload stay with a particular drone 106 for an entirety of a delivery from source to destination. In this manner, the payload cannot be transferred from one drone 106 to another as was done in the delivery of row four. The delivery flight path is determined as originating at the first host site, H1, traveling to the second host site, H2, then the third host site, H3, then the fourth host site, H4, then the fifth host site, H5, and then the sixth host site, H6, before reaching the fifth target site, T5. This flight path is designated by the node link expression H1-H2-H3-H4-H5-H6-T5. Since the delivery type is indicated as secure, the payload may not be transferred from one drone 106 to another along the path. Moreover, a secure delivery may restrict a drone 106 from staying at a waypoint (e.g., host site H1-H8) for longer than a predetermined amount of time. As such, to extend the range of the drone 106 to make the delivery, the power source of the drone may need to be replaced at one or more of the waypoints. As indicated in the fifth column, the range extension is identified as "PE," standing for Power Exchange. One example of a power exchange is a battery replacement, or exchange, made for the drone 106. The power exchange ("PE") is defined in the fifth column as occurring at each of host sites H2, H3, H4, H5, and H6.

The sixth row defines a delivery for a payload originating at first host site, H1, and having a destination at sixth target site, T6. The delivery flight path for the sixth row is determined as originating at the first host site, H1, traveling to the second host site, H2, then the third host site, H3, then the fourth host site, H4, then the fifth host site, H5, then the sixth host site, H6, then the seventh host site, H7, and then the eighth host site, H8, before reaching the sixth target site, T6. This flight path is designated by the node link expression H1-H2-H3-H4-H5-H6-H7-H8-T6. In this example delivery between host site H1 and target site T6, the delivery indication is marked as "economy," which may allow for the most economical and/or company-efficient delivery of the payload. An economy delivery may include more than one delay along the delivery path. Since delays may be incurred with an economy delivery, the range extensions are open to any type that the central flight server 120 determines provides the most economical or efficient output. For instance, the drone 106 travels from H1 is charged (e.g., identified as "C" in the fifth column) at host sites H2, H3, H4, and H5. Next, the drone 106 travels to the sixth host site, H6, where the payload is transferred to a first subsequent drone 106. After the transfer is made, the first subsequent drone 106 travels to the seventh host site, H7, and the payload is transferred to a second subsequent drone 106. Finally, the second subsequent drone 106 stops to fast charge (e.g., identified as "FC" in the fifth column) at the eighth host site, H8. Once fast charged, the second subsequent drone 106 flies to the sixth target site, T6 to deliver the payload.

Although described as having one or more range extension types for different delivery indications, it should be appreciated that the range extension type may vary depending on other factors. For instance, the environmental temperature, humidity, weather, time of day, and/or the like may be used to determine an appropriate range extension type.

In FIGS. 2A and 2B, the drones are described as making a one-way trip to deliver a payload. However, the present disclosure may include determining reverse flight paths for the drone 106 to return to the originating host site 112. Additionally or alternatively, the central flight server 120 may determine a flight path to direct the drone 106 to another host site 112 and/or target site 116 after making a delivery. The same, or similar, factors and/or considerations in determining the delivery flight path may be applied to flight paths for further deliveries or flight paths for return flights of the drone 106.

Leveraging multiple takeoff, landing, and/or delivery points within the range of medium sized drones 106 may increase the range and operability of the overall network 100. While a single drone 106 might have a single-flight range of 25 miles, the mesh network can extend the delivery range of the same units to hundreds of miles. As provided above, the drones 106 can either land and recharge, or drop a payload in a relay to the next available drone asset or host site 112.

Specific to a health solutions company, the drone delivery mesh network 200 utilizes existing location assets (e.g., host sites 112) to create the drone mesh network 200. This existing asset reuse allows for full coverage in high density areas. Modular hub pods can be utilized where existing asset density does not support operations. For example, the Hawaiian islands, most major cities, and the Florida coasts are especially well suited to these networks 200 based on, among other things, weather and asset density.

The drone mesh network 200 may operate in federal airspace regulated by the FAA and/or DOD. All airspace above ground level is considered regulated but different altitudes have different levels of regulation.

After takeoff, and before landing the drones 106 in the mesh network 200 are operating in federal airspace, which are not regulated by towns, cities, states etc. Local entities can regulate takeoff and landing locations and rules, which is why it is important to be good community partners. The takeoff and landing sites described herein are intended to be placed in protected areas (e.g., on top of existing assets, etc.), which are not accessible to the general public. Sound mitigation of the drones 106 can be instituted using a number of new and/or existing sound mitigation strategies.

Drone assets can be flexibly scalable, up or down, to support operations. A large market like the city of Dallas could be supported by as few as five operating drones 106. In an emergent market or area more drones 106 can be delivered to the area, pre-staged via existing courier delivery, unboxed and deployed to scale up delivery capacity even if roads and traditional air routes are unnavigable.

FIGS. 3A-3D show various block diagrams of drone interface areas 300A-300C of a host site 112 and/or target site 116. In each of the block diagrams shown, the drone 106 may include a body 304, a power compartment 306 (e.g., battery compartment, etc.), a lift support frame 308 to which one or more propellers 312 are attached, a landing frame 316 to which one or more landing feet 320 are attached, and a payload receptacle 324 that is capable of receiving and carrying a payload 330 from one point to another. The payload 330 may be enclosed in a carrier, cargo shuttle tube, or other container that fits or engages with the payload receptacle 324.

In some examples, the propellers 312 may be designed to mitigate the intensity of sound produced during takeoff and landing. In one example, drones 106 may employ two noise reduction designs with their rotors. The first innovation is a noise cancelling blade shape. For instance two sets of blades of the propellers 312 may generate a sound wavelength that is opposite the other pair of blades of the propellers 312, creating an auditory cancelling effect for the drone 106.

Additionally or alternatively, a cut wing strategy may be employed where the shape of the rotor optimizes the "slice" through the air while still providing adequate lift for the drone 106. The tip of each blade of the propellers 312 may be designed with a "cut tip" which may reduce the air vortex created by each blade rotation as the propellers 312 cut through the air. Drone 106 (e.g., quadcopter, etc.) sound is mostly the sound of the air coming back together after it is split by the blade of a propeller 312 (sounding like mini thunder). By engineering a cutout section at the end of the blade the noisiest air vortex that the blade of the propeller 312 creates may be significantly reduced. In some cases, this design approach may reduce blade sound, or noise, by up to 20 decibels.

Figure 3A:
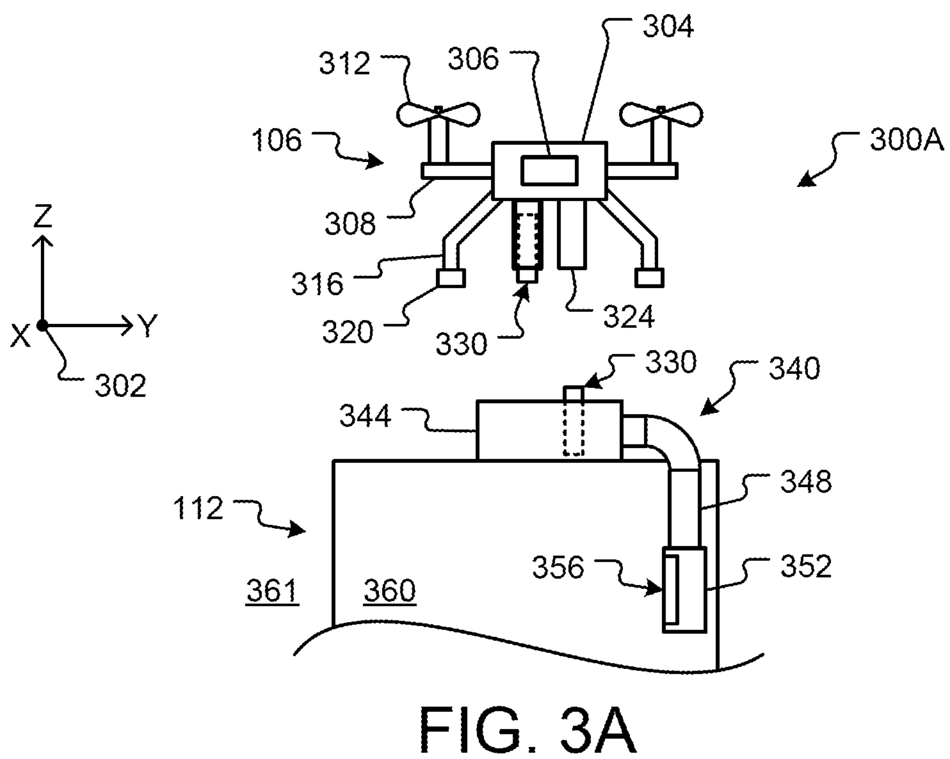
FIG. 3A shows a block diagram of a payload exchange area of a drone delivery system in accordance with examples of the present disclosure.

Referring now to FIG. 3A, a block diagram of a payload exchange area 300A of a drone delivery system 100 is shown in accordance with examples of the present disclosure. In some examples, loading, takeoff, and delivery all happen without human interaction with the drone 106. At certain host site 112 locations a solar powered on roof take off and loading location may be fed payload tubes through a pneumatic tube system. The pneumatic tube system both raises outgoing payloads to the takeoff and loading area and may return the payloads to the human level. Each component of the interface may be modular allowing for scale and multiple configurations.

Payload capture systems 340 may be roof mounted for through building operation or may be externally mounted like a drain gutter to the outside of the building. The payload capture system 340 may include one or more payload receiver funnels that can be either low volume or interface with a modular high volume sorter. In one example, a low volume receiver unit may include a receiver funnel body with appropriate landing doors, a delivery pipe to an external ground level location and a pickup/retrieval door. This low volume version may utilize bristles in the receiver tube to slow the drop of the payload and may operate completely based on gravity. The receiver funnel, like all receiver funnels could include a communication tag reader or radio frequency (e.g., UHF, RF, etc.) identification tag reader which can notify both the sender (e.g., the company) and the receiver (e.g., the client) of the arrival of a payload. The low volume receiver unit may be used by one or more of the target sites 116 described herein.

In any case, the receiver funnel module may be a modular capture device that helps the drone 106 target the delivery location, create a catch point, and protects the rest of the system from weather. This modular capture device can be applied to a high volume system, a low volume system, and/or a modular pod location.

As illustrated in FIG. 3A, the payload capture system 340 may include a tube catch and release module that captures a dropped drone payload, merges the payload with a pneumatic tube system, and delivers the payload to an interior space 360 of the host site 112 building. The payload capture system 340 may include a drone loading platform that receives a payload from the interior space 360 of the host site 112 building (e.g., via the pneumatic tube system of the payload capture system 340) and then prepares and presents the payload 330 for capture by the drone 106 on the exterior space 361 of the host site 112 building.

The payload capture system 340 may include a receiver funnel body 344 interconnected to a delivery pipe 348, and a pickup space 352 of a pneumatic tube system. The pickup space 352 may include a pickup retrieval door 356 to access a payload 330 sent from the exterior space 361 to the interior space 360 (e.g., via the delivery pipe 348). Additionally or alternatively, the pickup retrieval door 356 may be opened to insert a payload 330 that is to be transferred from the interior space 360 to the exterior space 361 via the delivery pipe 348. In particular, once the payload 330 is inserted into the pickup space 352, the pickup retrieval door 356 can be closed causing a vacuum of air to move the payload 330 from the pickup space 352 to the receiver funnel body 344.

In one example, the drone 106 may drop the payload 330 from a distance (e.g., measured along the Z-axis of the coordinate system 302 shown in FIG. 3A) above the receiver funnel body 344. Additionally or alternatively, the drone 106 may land and/or engage with the payload capture system 340 before transferring, or releasing, the payload 330 from the payload receptacle 324. Similarly, the drone 106 may land and/or engage with the payload capture system 340 to pick up the payload 330 from the receiver funnel body 344. The pickup may include a mechanical gripper, vacuum system, or other locking mechanism built into the payload receptacle 324 and/or the drone 106. This payload capture system 340 may be configured to capture, protect, and discharge the pneumatic tube compatible payload 330 on any drone platform.

An example payload 330 capture device is now described. The drone 106 may drop the payload 330 to be captured by the outdoor device (e.g., the receiver funnel body 344). The outdoor device captures the payload 330 and may then prepare it for integration into the pneumatic tube system. The payload capture system 340 then automatically sends the received payload 330 into the pneumatic tube system. In some cases communication tag (e.g., use of one or more Radio Frequency Identification ("RFID") tags, near field communication ("NFC") tags, other Internet-of-Things ("IoT") tags or devices, etc.) integration may help determine the end location within the pneumatic tube system. The communication tag may include a memory storage device (e.g., RAM, ROM, etc.), a communications antenna, a transmitter, a receiver, a processor, and/or combinations thereof.

An example payload 330 loading device is now described. Outbound payloads 330 may be sent from inside (e.g., the interior space 360) through the pneumatic tube system. The payload 330 may terminate in a drone loading device (e.g., part of the receiver funnel body 344) that removes the payload 330 from a shuttle or prepares the payload for drone pickup. This device may be combined with the capture device or be a standalone device.

Figure 3B:
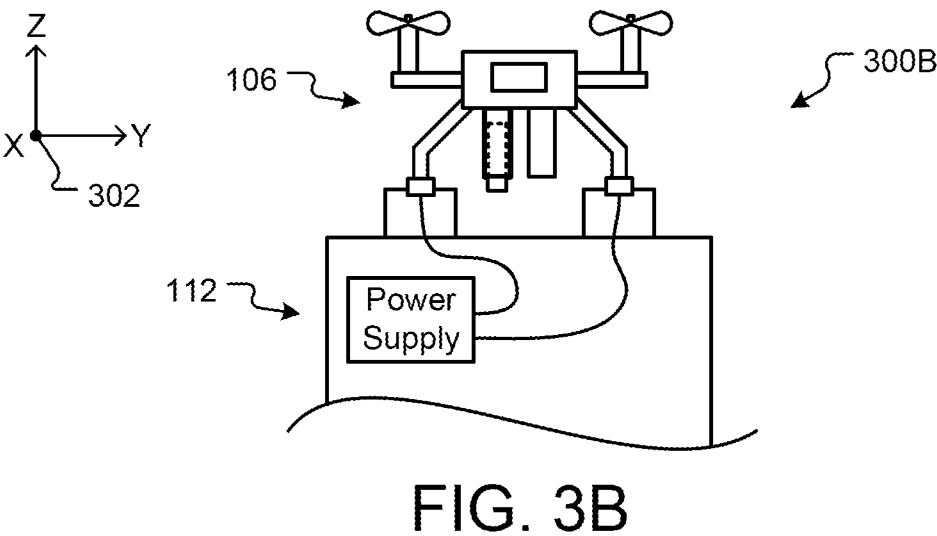
FIG. 3B shows a block diagram of a charging area of the drone delivery system in accordance with examples of the present disclosure.

FIG. 3B shows a block diagram of a charging area 300B of the drone delivery system 100 in accordance with examples of the present disclosure. In some examples, the host sites 112 and/or the target sites 116 may provide charging capabilities for a drone 106. The drone charging area 300B may include a power supply that is configured to transfer energy to the drone 106. As shown in FIG. 3B, electrical energy is transferred from the power supply to the drone 106 via one or more of the landing foot 320 electrically contacting a corresponding electrical contact pad interconnected with the power supply. Although shown as part of a host site 112, the drone charging area 300B may be a part of a target site 116 or other site in the drone delivery system and network 100.

Figure 3C:
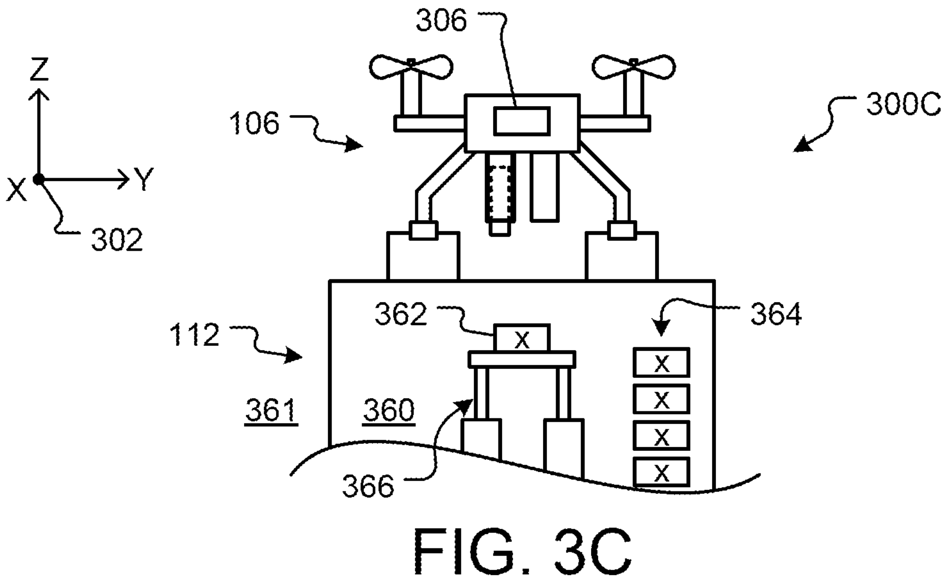
FIG. 3C shows a block diagram of a power exchange area of the drone delivery system, in an unactuated state, in accordance with examples of the present disclosure.
Figure 3D:
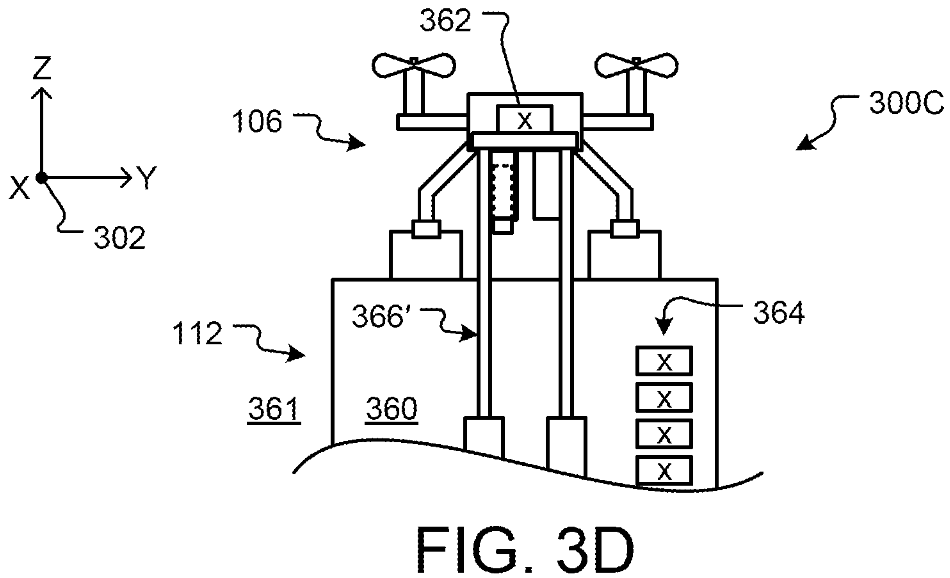
FIG. 3D shows a block diagram of the power exchange area of the drone delivery system, in an actuated state, in accordance with examples of the present disclosure.

FIG. 3C shows a block diagram of a power exchange area 300C of the drone delivery system 100, in an unactuated state, in accordance with examples of the present disclosure. FIG. 3D shows a block diagram of the power exchange area 300C of the drone delivery system, in an actuated state, in accordance with examples of the present disclosure. In some examples, the host site 112 and/or the target site 116 may include a power exchange system including a number of charged batteries 364 available to exchange with a drone 106. When the drone 106 lands in the drone power exchange area 300C, an exchange lift mechanism 366 may transfer a battery 362 from the interior space 360 to the exterior space 361 to be inserted into the power compartment 306 of the drone 106. Once the exchange lift mechanism 366 has extended, as shown in FIG. 3D, a used battery may be removed from the drone 106 and the new battery 362 may be transferred into the power compartment 306. The power exchange system may be used to quickly extend the range of a drone 106 without requiring the drone 106 to remain in proximity to the host site 112 and/or target site 116 while charging.

Figure 4:
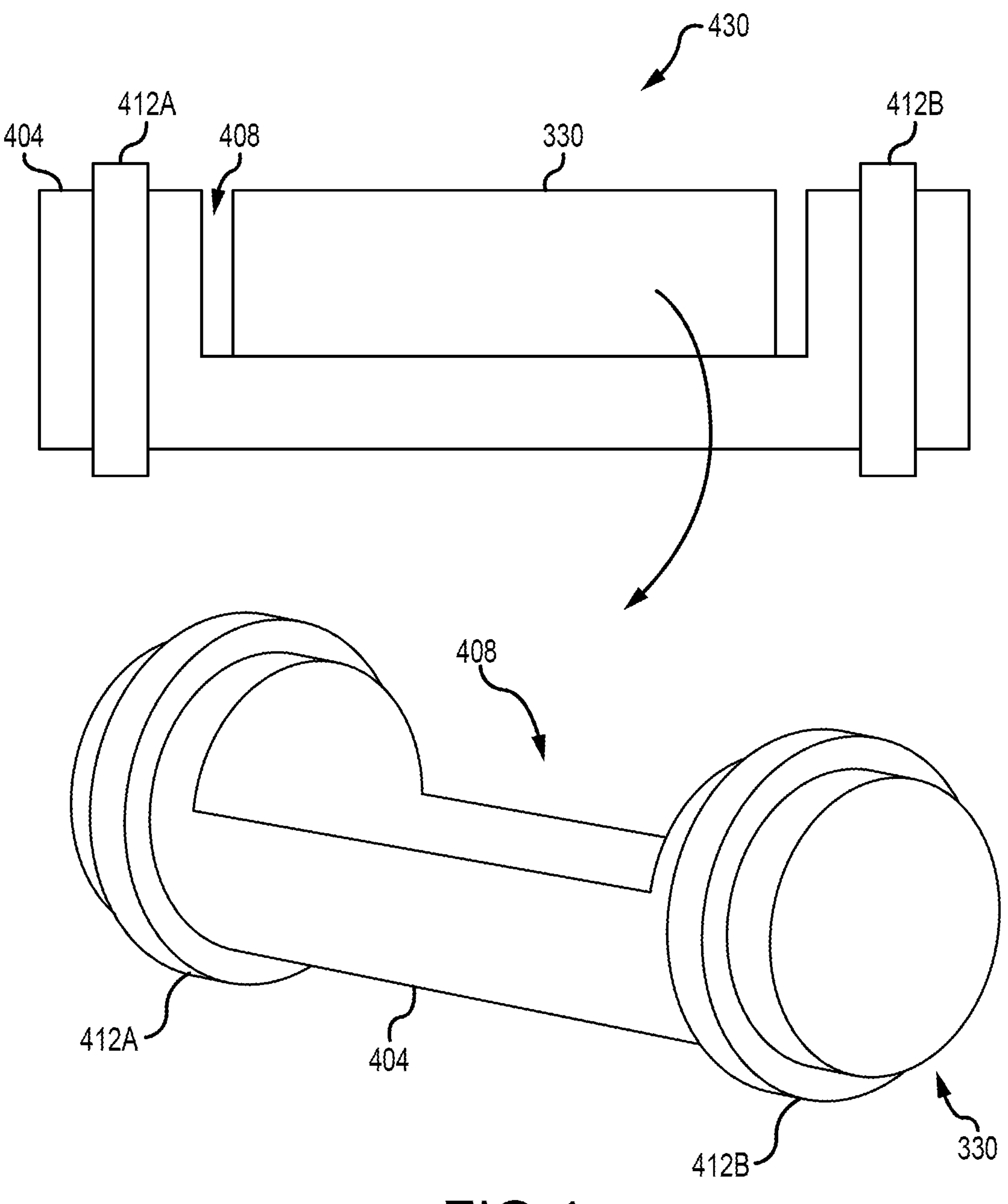
FIG. 4 shows a views of a cargo shuttle tube used in the drone delivery system with and without a payload in accordance with examples of the present disclosure.

FIG. 4 shows a views of a cargo shuttle tube 430 used in the drone delivery system 100 with and without a payload 330 in accordance with examples of the present disclosure. In some examples, the payload 330 may include a container, cover, or transport shell that follows the payload 330 from point to point. In one example, the payload 330 may utilize the cargo shuttle tube 430 as the container.

As provided above, one example of the payload 330 may correspond to a drone compatible standalone item that contains items therein and that would directly integrate into the pneumatic tube system. Another example of the payload 330 would allow for the drone payload to be carried in the pneumatic tube system via a separate cargo shuttle tube 430 that could receive, transport and discharge the payload 330. In yet another example, the payload can comprise a re-usable container. The re-usable container can be insulated, weather-sealed, padded and/or impact resistant, etc. to protect medication, medical equipment, medical supplies, etc. placed therein. According to one embodiment, the payload can further comprise an Internet-of-Things (IoT) device 406 disposed in or on the payload, e.g., within the re-usable container. The IoT device 406 can comprise one or more sensors including, but not limited to, a GPS receiver, a temperature sensor, a shock sensor, etc. to identify the current geographic location of the payload 330, measure the ambient temperature of or around the payload, etc. The central flight server 120 and/or other systems can communicate with the IoT device 406 through the communications network 104 to track the location of the payload, monitor and record temperature and/or other environmental factors for the payload, etc.

The cargo shuttle tube 430 may be used to transport a payload 330 within a pneumatic tube system. Most pneumatic tube systems load from the end, in this case the payload may nest into the payload receptacle 408 of the cargo shuttle tube 430 and can be held in place in the cargo shuttle tube 430 until removed by the end user/recipient. The cargo shuttle tube 430 may include a shuttle tube body 404 in a substantially cylindrical shape. The cargo shuttle tube 430 may include a compliant, or flexible, first vacuum seal 412A and a second vacuum seal 412B that engage with the delivery pipe 348 of the pneumatic system to block air from passing around the cargo shuttle tube 430 during pneumatic transfer. The payload receptacle 408 may correspond to a cutout portion of the shuttle tube body 404 between the first vacuum seal 412A and the second vacuum seal 412B. The payload receptacle 408 may be sized to receive the payload 330.

Cargo shuttle tubes 430 may be designed to work as both carriers in the pneumatic tube system as well as payload 330 carriers. A receiver shuttle converts standardized drone payloads to pneumatic tube system compatible as there are many systems of varying diameters and operational pressures. Certain cargo shuttle tubes 430 may be configured to operate within a native pneumatic system allowing for seamless operation across all components. Drones 106 may deliver a single cargo shuttle tube 430 in a low volume scenario but may scale to sets of two, three, four, or more. Even sets of shuttle receivers may allow for load balancing of the drone 106. In one example, low energy high-strength magnets may be used to hold cargo shuttle tube 430 in place in the drone 106. In this case, the release of a cargo shuttle tube 430 may only require a power discharge, or a change in magnetic polarity, to release or capture a payload shuttle.

Cargo shuttle tubes 430 can be transported from packaging locations via normal air/ground parcel delivery in delivery pods. Delivery pods may interface with last mile delivery locations by simply opening the pods and sliding it into the modular delivery unit.

Loading of the cargo shuttle tube 430 may be similar to shuttle capture for delivery, but in reverse. The pneumatic tube system may load a cargo shuttle tube 430 into a loading and/or sorting device. The loading device may prepare a single cargo shuttle tube 430 or multiple cargo shuttle tubes 430 for pickup from the last mile or drone 106 which would capture the prepared cargo shuttle tubes 430 for delivery to the next location. In one example, the drone 106 may hover and capture the cargo shuttle tube 430 via magnetic attraction (e.g., without landing) continuing to operate in the FAA and/or DOD regulated airspace rather than requiring landing of the drone 106 to load the cargo shuttle tube 430.

The cargo shuttle tube 430 may include a communication tag (e.g., an IoT tag, an RFID tag, an NFC tag, etc.) that establishes recipient attributes and that can aid in determining routing of the payload 330. Each communication tag may log or store location, temperature, and/or other data points as the cargo shuttle tube 430 moves in the drone delivery system and network 100.

Within the drone delivery system and network 100, emergency response shuttles (e.g., cargo shuttle tubes 430, a reusable container, a universal harness/payload, etc.) may be used to deliver emergency medicines via application request (e.g., from an application running on a smartphone, etc.) and/or by emergency (e.g., 911) dispatch for emergency use drugs such as Epinephrine, Narcan, Insulin, or even a Defibrillator in a short amount of time. By way of example, an average emergency response time into a location within a supported area may be as short as 4 minutes or less. This emergency response delivery may utilize the dynamics and coverage of the drone mesh network 200 to deploy a preloaded payload 330 to a required area based on a dispatch request.

Figure 5A:
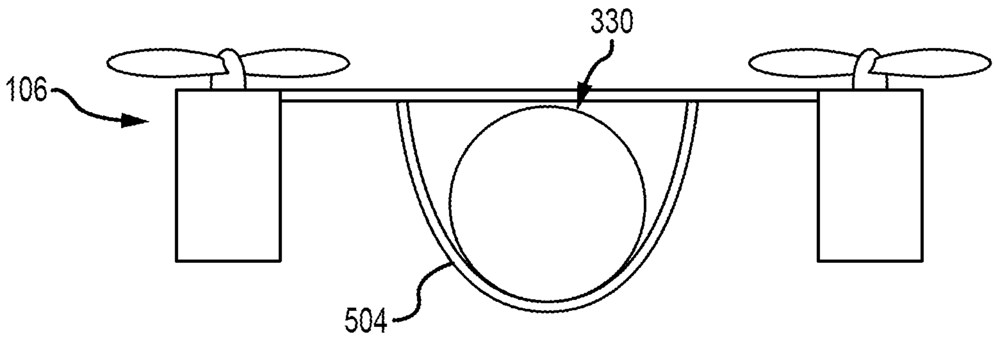
FIG. 5A shows a schematic block diagram of a drone with a payload capture cradle in a secured state.
Figure 5B:
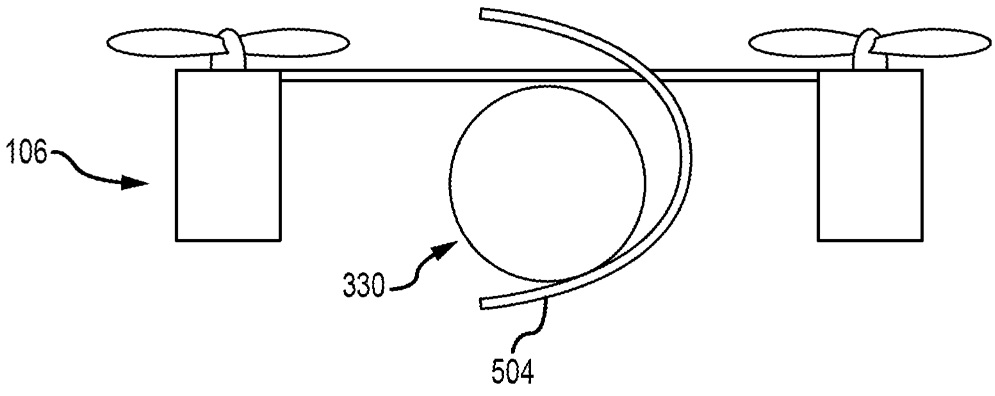
FIG. 5B shows a schematic block diagram of the drone with a payload capture cradle in a partially released state.
Figure 5C:
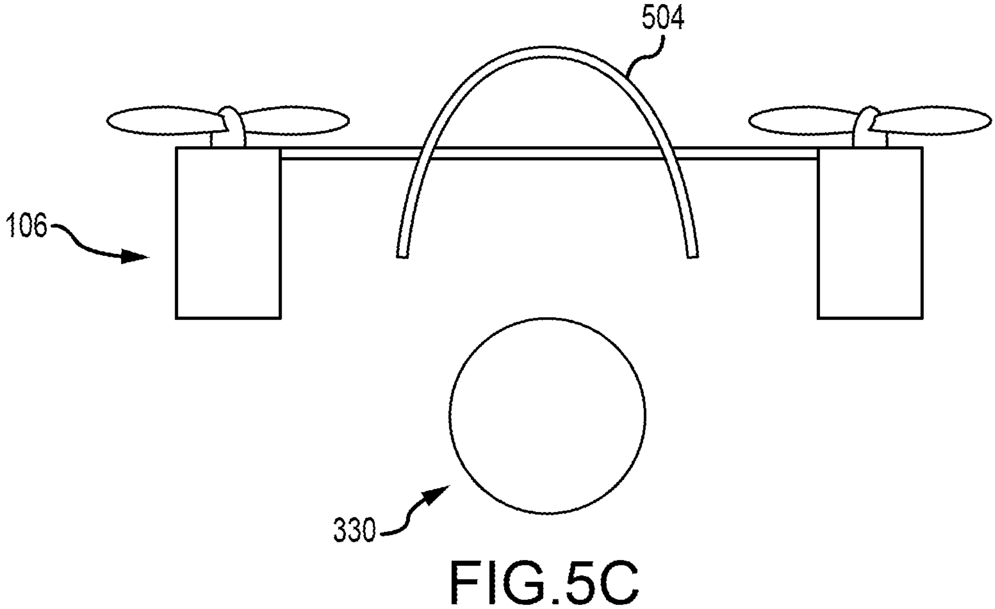
FIG. 5C shows a schematic block diagram of the drone with a payload capture cradle in a released state.

FIGS. 5A-5C show schematic block diagrams of a drone 106 releasing a payload 330 from a cradle door 504 (e.g., of the payload receptacle 324). As illustrated in FIG. 5A, a cradle door 504 is shown with a payload 330 and payload capture cradle in a secured state. The cradle door 504 may be caused to rotate (e.g., counterclockwise) exposing an opening of the cradle door 504 at the bottom of the drone 106. In FIG. 5B the payload capture cradle 504 is shown in a partially released state. As the cradle door 504 continues to rotate, the opening is arranged such that the payload 330 is allowed to pass through the opening (via gravity), and the payload 330 is released from the drone 106. This release of the payload 330 is shown in FIG. 5C.

Figure 6A:
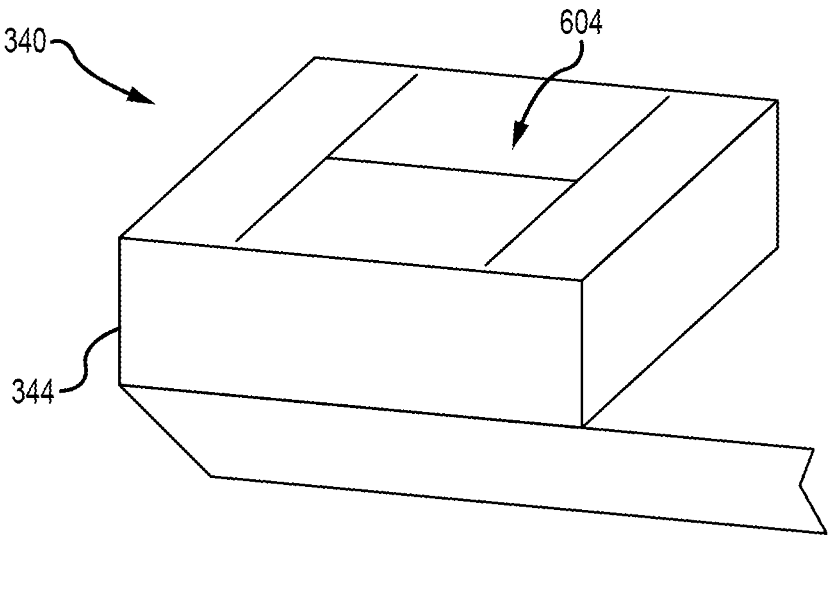
FIG. 6A shows a schematic perspective view of a payload capture system with the outer doors closed in accordance with examples of the present disclosure.
Figure 6B:
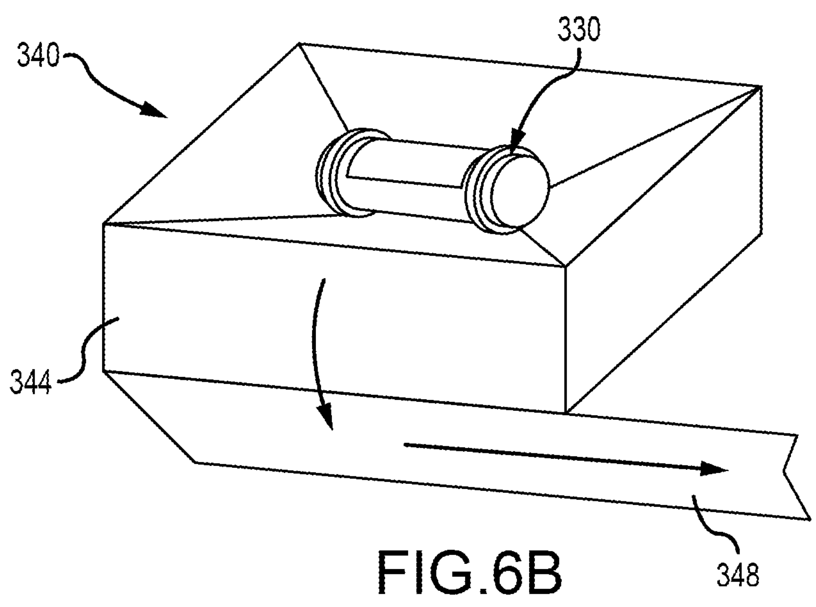
FIG. 6B shows a schematic perspective view of the payload capture system with the outer doors opened and receiving a payload in accordance with examples of the present disclosure.

FIGS. 6A and 6B show schematic perspective views of the payload capture system 340 in accordance with examples of the present disclosure. The payload capture system 340 may include one or more capture system doors 604 that cover an internal space of the receiver funnel body 344. In FIG. 6A, the capture system doors 604 are closed and, in FIG. 6B, the capture system doors 604 are open and a payload 330 is received into an internal funnel area of the receiver funnel body 344. The payload capture system 340 may comprise a weatherproof receptacle that is configured to capture a dropped pneumatic tube compatible payload 330. Inside the receiver funnel body 344 the interface may add the payload 330 to a tube shuttle 430 or introduce the standalone payload 330 to the pneumatic tube system (e.g., via the delivery pipe 348). In some examples, the payload 330 may include an integrated tracking device (e.g., a communication tag, etc.) to record and track the status of the payload 330. In any event, once inside the receiver funnel body 344 the payload 330 is introduced to the pneumatic tube system for delivery to the interior space 360 of the building.

Figure 7:
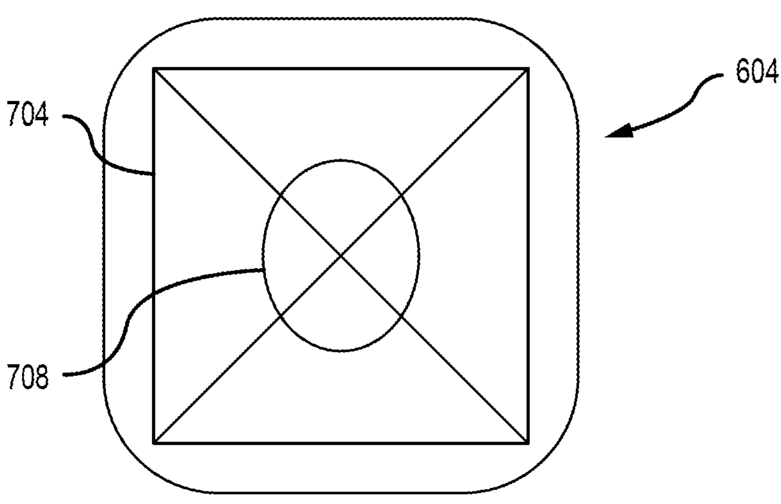
FIG. 7 shows a plan view of the outer doors of the payload capture system with alignment fiducials and graphics thereon in accordance with examples of the present disclosure.

FIG. 7 shows a plan view of the capture system doors 604 of the payload capture system 340 with alignment fiducials and graphics 704, 708 thereon in accordance with examples of the present disclosure. The first and/or second graphics 704, 708 may include one or more markings that aid in alignment of a drone 106 with the payload capture system 340. The first graphics 704 are shown as a box with an "X" in the center of the capture system doors 604. The second graphics 708 are shown as an ellipse, or circle, defining a center area of the capture system doors 604 and/or the receiver funnel body 344. Additionally, or alternatively, the landing zone can be identified by a camera readable code (not shown here) such as a QR code or similar.

Figure 8:
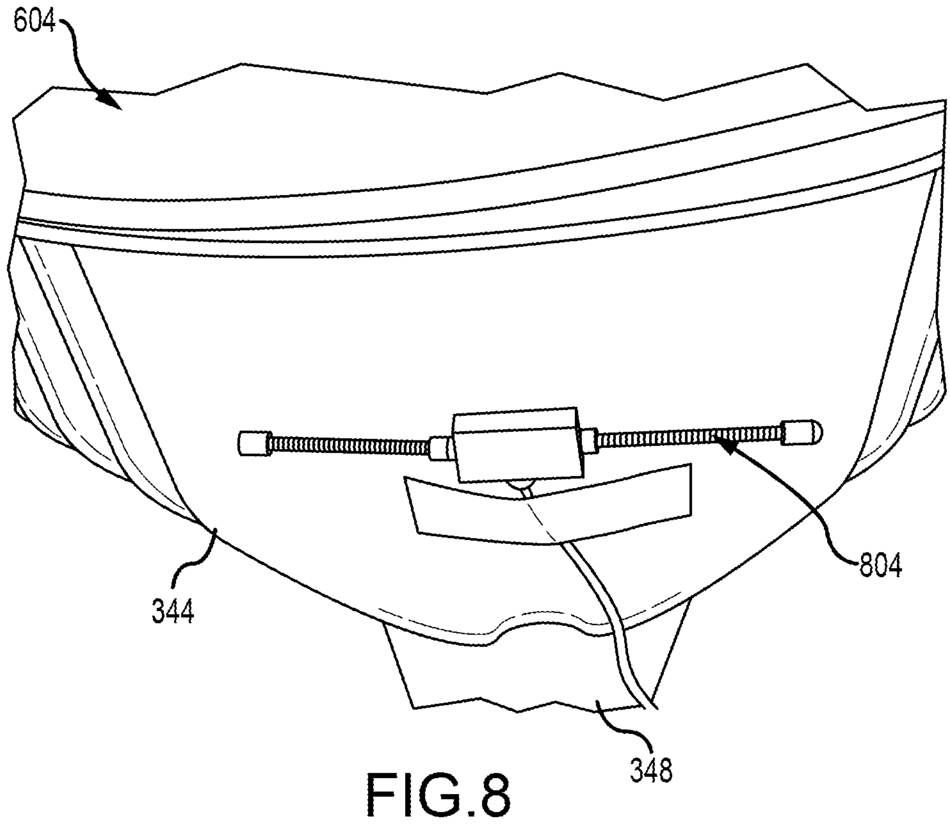
FIG. 8 is a detail schematic perspective view of a portion of the payload capture system in accordance with examples of the present disclosure.

FIG. 8 is a detail schematic perspective view of a portion of the payload capture system 340 in accordance with examples of the present disclosure. In some examples, the payload capture system 340 may include one or more wireless communication module 804. The wireless communication module 804 may enable communications between a drone 106 and the payload capture system 340 and/or include a communication tag reader (e.g., an RFID reader, NFC reader, IoT reader, etc.). In one example, components of the delivery takeoff and delivery system may include a communication tag detection antenna. As provided above, the payloads 330 may include, or carry, integrated communication tags (e.g., RFID tags, etc.) that are capable of logging and transmitting, when polled, location, temperature, other readings, etc., and/or combinations thereof associated with an environment in which the payload 330 is located.

The capture system doors 604 may open and close based on approaching deliveries and/or drones 106. The capture system doors 604 may protect payloads 330 and the greater system from pests and weather. High volume systems may have a receiver funnel that orients and/or empties payloads into a sorter unit. The sorter unit may prepare payloads 330 for redelivery via another drone 106 in a shuttle relay or direct the payloads 330 to ground level for delivery to the recipient or second stage sorter. Delivery and retrieval from roof landing and delivery zone may utilize existing pneumatic tube technology with drone delivery interface modifications. Among other things, the interface isolates humans from the rooftop or external delivery, takeoff and landing locations of the drone 106.

As noted above, one or more target sites of the drone delivery system and network can comprise a parcel pod 118. As introduced, the parcel pod 118 can comprise a relatively small, building-like structure roughly the size of a trailer or shipping container. For example, and in one implementation, the parcel pod 118 can be approximately 20 feet long, 8 feet wide, and 9 feet high. Such a size would allow the parcel pod 118 to be transportable on a flatbed trailer and/or in a rail shipping container for transportation to an installation site. The parcel pod 118 can be installed in an area which, for example, because of remoteness or other factors, is not otherwise conveniently served by a pharmacy or similar retail facility. As will be described, the parcel pod can be equipped to receive payloads from drones, sort the payloads, and store the payloads. The payloads can then be picked up by an intended recipient or dispatched for last mile delivery.

Figure 9A:
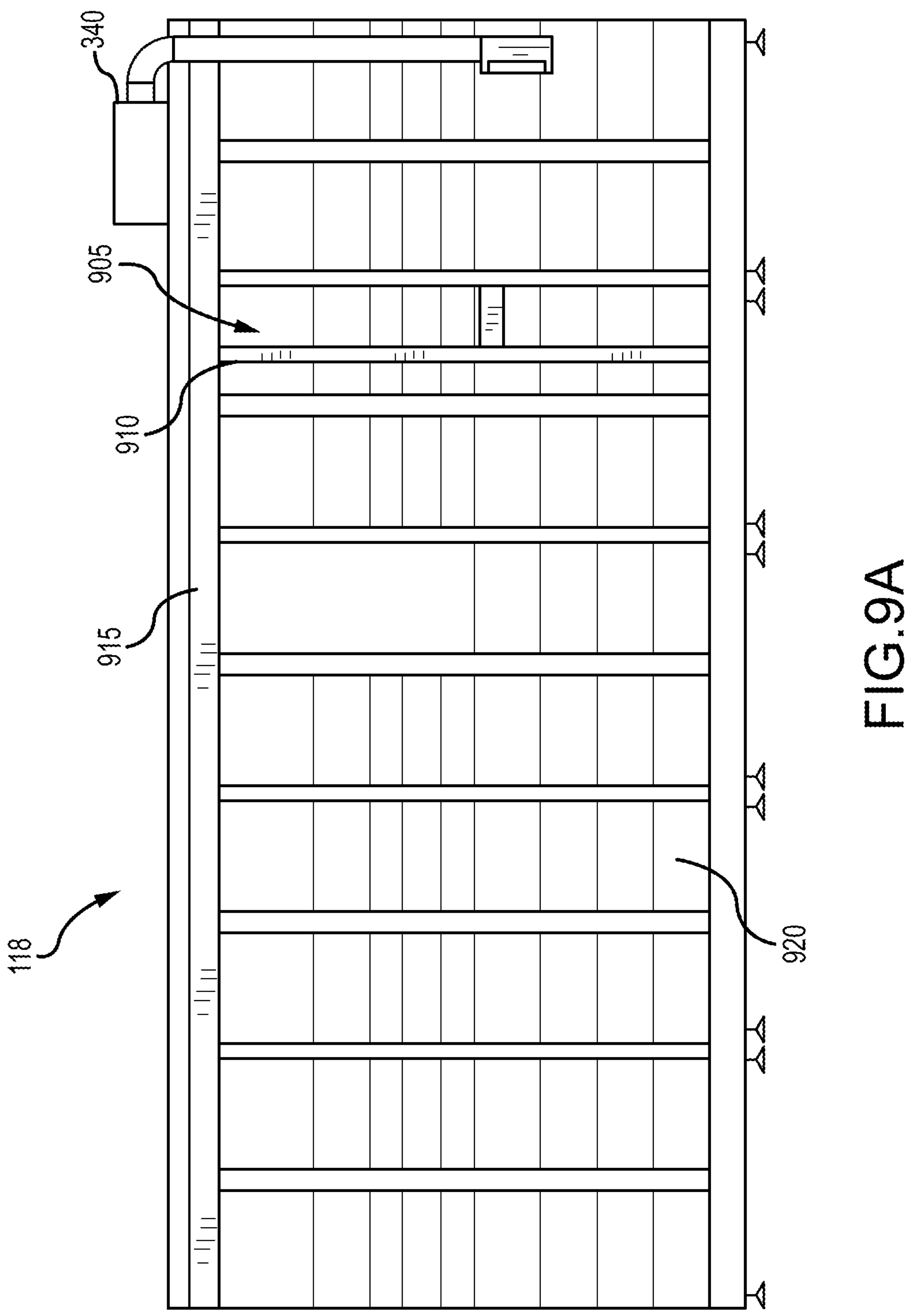
FIGS. 9A-9C are diagrams illustrating different views of a parcel pod according to various embodiments of the present disclosure.
Figure 9B:
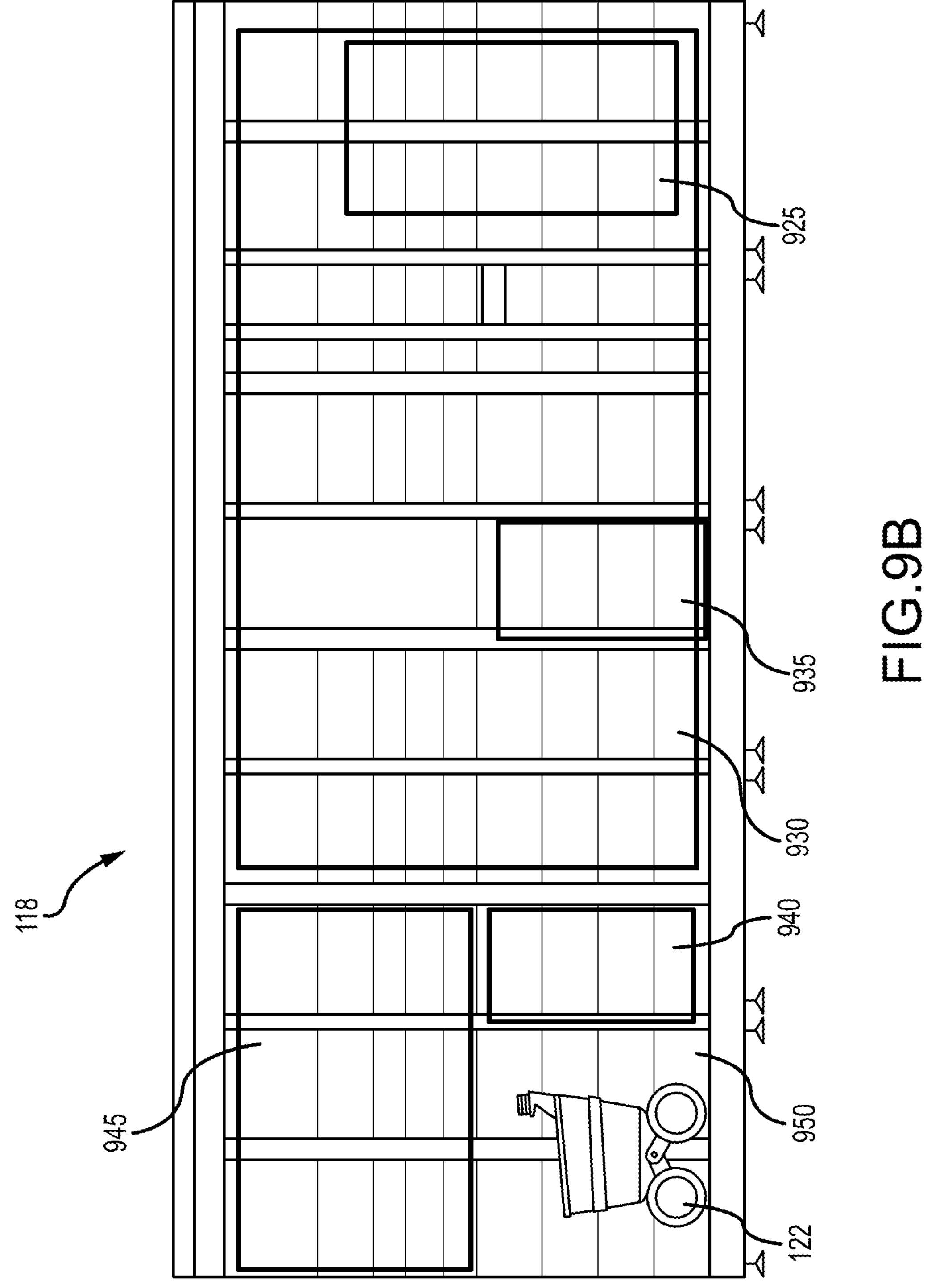
Figure 9C:
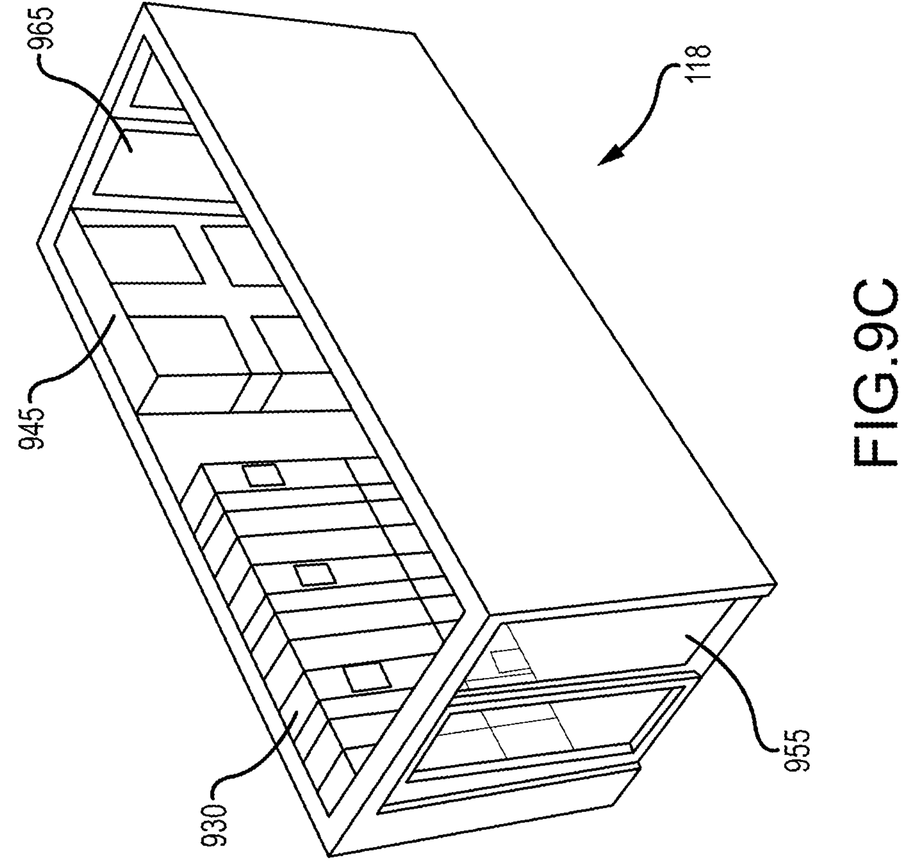

FIGS. 9A-9C are diagrams illustrating different views of a parcel pod according to various embodiments of the present disclosure. More specifically, FIG. 9A illustrates a cross-section view of a parcel pod 118. As can be seen in this example, a payload capture system 340 as described above can be installed on the parcel pod 118 to allow for payload 330 capture from a drone 106 and to convey the payload 330 to the interior of the parcel pod 118. A gantry robot 905 can be installed inside of the parcel pod 118. The gantry robot 905 can comprising a vertical track 910 and a horizontal track 915 allowing the gantry robot 905 to move about the interior of the parcel pod 118 and move delivered payloads to payload lockers 920 inside of the parcel pod 118.

FIG. 9B illustrates the same cross-sectional view of the parcel pod 118 as illustrated in FIG. 9A but further highlighting different areas or features within the parcel pod 118. For example, the parcel pod 118 can comprise an incoming parcel sort area 925. The incoming parcel sort area 925 can be a location within the parcel pod 118 where payloads 330 can be deposited by the payload capture system 340 to be picked up by the gantry robot 905 for conveyance to another portion of the parcel pod 118 such as a customer pick-up locker area 930.

The customer pick-up locker area 930 can comprise a number of individually accessible lockers, some of which may be refrigerated and/or climate controlled, into which the gantry robot 905 can place payloads 330 for pickup but the intended recipient. For example, a customer or other intended recipient can access the interior of the payload pod 118 through a door (not shown in this view). Once inside the payload pod 118, the customer or intended recipient can access a designated pick-up locker of the pick-up locker area 930. Access to the interior of the parcel pod 118 and/or the individual pick-up locker can be achieved in a number of different ways. According to one embodiment, this access can be achieved by the customer or intended recipient scanning a barcode or QR code of a physical card or presented through an app on a mobile device at a reader (not shown here) of the parcel pod 118 and/or payload locker. In another embodiment, access may be gained by NFC, RF, Bluetooth, or other scanning of a mobile device executing an access application, access card, dongle, etc., by a scanner or reader (not shown here) of the parcel pod 118 and/or payload locker. In yet another embodiment, access can be gained by entering a code into a keypad (not shown here) with the code being unique to the customer or other recipient. Other methods for accessing the parcel pod 118 and payload locker are contemplated and considered to be within the scope of the present disclosure.

Within the pick-up locker area 930 can also be a payload recycle area 935. The payload recycle area 935 can comprise one or more bins or other containers into which a customer or intended recipient can place packaging and/or other reusable portions of a retrieved payload 330. For example, in the case that the payload 330 comprises a reusable container into which a medication, medical device, etc. is placed for delivery, the customer or intended recipient can retrieve these produces from the reusable container and place the reusable container into a bin or other container or compartment of the payload recycle area 935.

The parcel pod 118 can further comprise an IT area 940 containing controllers, communications equipment, and other components to support operation of the parcel pod 118 as described herein. For example, the IT area 940 can comprise wireless communications transceivers and other components to support communication with the central flight server 120 and/or other host systems. The IT area 940 can further comprise one or more controllers and other components for identifying and tracking received payloads 330, e.g., via RF and/or NFC tags and/or IoT devices 406 disposed on or within the payload 330, operating the gantry robot 905, controlling access to the parcel pod 118 and/or parcel lockers, etc. According to one embodiment, the electrical and electronic components of the parcel pod 118 can be powered by a solar power system comprising solar panels (not shown here) disposed on an exterior of the parcel pod, e.g., on a roof of the parcel pod 118, batteries (not shown here) and a control which can also be contained in the IT area 940 of the parcel pod 118.

According to one embodiment, the parcel pod 118 can further comprise a back-staged storage area 945. Generally speaking, the back-staged storage area 945 can comprise a set of pick-up lockers similar to the pick-up lockers of the pick-up locker area 930. However, the pick-up lockers of the back-staged storage area 945 can be loaded with payloads 330 by the gantry robot 905 from an interior of the parcel pod 118 and accessed by the customer or other intended recipient from outside of the parcel pod 118. In this way, customers and/or other intended recipients need not enter the parcel pod 118 itself. Access to the pick-up lockers of the back-staged area 945 can be controlled in ways similar to those described above for controlling access to the interior of the parcel pod 118 and/or pick-up lockers of the pick-up locker area 930.

According to one embodiment, the parcel pod 118 can further comprise a last mile delivery robot interface area 950. The last mile delivery robot interface area 950 can comprise a garage-like area into which a last mile delivery robot 122 can be docked for charging, payload loading by the gantry robot 905, storage, etc. Generally speaking, the last mile delivery robot 122 can comprise a battery operated autonomous vehicle further comprising a payload area for storing and a payload 330. Operation of the last mile deliver robot 122 can be controlled and tracked by the central flight server 120, one or more other host systems, the parcel pod 118, or others to direct the last mile delivery robot 122 to a final destination target area such as a private home, business, etc.

FIG. 9C illustrates an isometric view of the parcel pod 118 as described above. As illustrated in this example, the parcel pod 118 can include a door 955 providing access to the pick-up locker area 930 as described above. Also as can be seen here, the parcel pod 118 can comprise a door 965 providing ingress to and egress from the parcel pod 118 by the last mile delivery robot 122. For example, this door 965 can be controlled by control circuits of the parcel pod 118 to open the door 965 to dispatch the last mile deliver robot 122 and close the door 965 after its departure. The door 965 may be similarly be controlled to open based on sensors and/or scanners (not shown here), such as RF, NFC Bluetooth, etc. readers, through which the last mile delivery robot can be detected as it approaches the parcel pod 118 on return.

Any of the steps, functions, and operations discussed herein can be performed continuously and automatically.

While the flowcharts have been discussed and illustrated in relation to a particular sequence of events, it should be appreciated that changes, additions, and omissions to this sequence can occur without materially affecting the operation of the disclosed examples, configuration, and aspects.

The exemplary systems and methods of this disclosure have been described in relation to drone delivery methods, devices, and systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one example," "an example," "some examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in conjunction with one example, it is submitted that the description of such feature, structure, or characteristic may apply to any other example unless so stated and/or except as will be readily apparent to one skilled in the art from the description. The present disclosure, in various examples, configurations, and aspects, includes components, methods, processes, systems and/or apparatus substantially as depicted and described herein, including various examples, sub-combinations, and subsets thereof. Those of skill in the art will understand how to make and use the systems and methods disclosed herein after understanding the present disclosure. The present disclosure, in various examples, configurations, and aspects, includes providing devices and processes in the absence of items not depicted and/or described herein or in various examples, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Moreover, though the description of the disclosure has included description of one or more examples, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative examples, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Any one or more of the above aspects/examples as substantially disclosed herein.

Any one or more of the aspects/examples as substantially disclosed herein optionally in combination with any one or more other aspects/examples as substantially disclosed herein.

One or means adapted to perform any one or more of the above aspects/examples as substantially disclosed herein.

Any one or more of the features disclosed herein.

Any one or more of the features as substantially disclosed herein.

Any one or more of the features as substantially disclosed herein in combination with any one or more other features as substantially disclosed herein.

Any one of the aspects/features/examples in combination with any one or more other aspects/features/examples.

Use of any one or more of the aspects or features as disclosed herein.

It is to be appreciated that any feature described herein can be claimed in combination with any other feature(s) as described herein, regardless of whether the features come from the same described example.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably and include any type of methodology, process, mathematical operation, or technique.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A drone delivery system, comprising:

a drone comprising a body, the body comprising a frame that supports a plurality of rotors, a power compartment disposed in the body, the power compartment supporting a battery that provides power to each rotor of the plurality of rotors, and a payload receptacle that is configured to receive and hold a payload during flight;

a host site comprising a payload capture system that is configured to load the payload into the payload receptacle of the drone, wherein the payload capture system comprises a receiver funnel body that arranges the payload for loading into the drone;

a central flight server that communicates wirelessly with the drone and automatically directs a delivery of the payload by the drone from the host site to at least one target site that is remotely located apart from the host site; and a parcel pod comprising a drone interface area, wherein the drone interface area of the parcel pod comprises a payload capture system that is configured to receive the payload from the drone, wherein the payload capture system comprises a receiver funnel body disposed on an exterior space of the parcel pod and a pneumatic tube system coupled with the payload capture system that conveys the payload from the receiver funnel body to a payload sort area of the parcel pod, and wherein the parcel pod further comprises a plurality of payload lockers and a gantry robot adapted to receive the payload from the payload sort area to a payload locker of the plurality of payload lockers.

2. The drone delivery system of claim 1, wherein the host site further comprises:

a pneumatic tube system that conveys the payload from an interior space of the host site to the receiver funnel body arranged on an exterior space of the host site.

3. The drone delivery system of claim 2, wherein the pneumatic tube system is further configured to convey a received payload from the receiver funnel body arranged on the exterior space of the host site to the interior space of the host site via at least one delivery pipe.

4. The drone delivery system of claim 3, wherein the payload comprises a cargo shuttle tube, and wherein the cargo shuttle tube comprises a communication tag attached to a body of the cargo shuttle tube.

5. The drone delivery system of claim 1, wherein the payload comprises a reusable container.

6. The drone delivery system of claim 5, wherein the payload further comprises a medication disposed within the reusable container.

7. The drone delivery system of claim 5, wherein the payload further comprises medical equipment disposed within the reusable container.

8. The drone delivery system of claim 5, wherein the reusable container further comprises an Internet of Things (IOT) device disposed therein and wirelessly communicating with a communications network.

9. The drone delivery system of claim 8, wherein the central flight server further monitors a location of the reusable container and a temperature within the reusable container based on communications received from the IoT device.

10. A delivery network comprising:

a plurality of host sites, each host site comprising a drone interface area, the drone interface area of each host site further comprising:

a payload capture system that is configured to load a payload into a payload receptacle of a drone, wherein the payload capture system comprises a receiver funnel body disposed on an exterior space of the host site and that arranges a payload for loading into the drone, a pneumatic tube system coupled with the payload capture system that conveys the payload from an interior space of the host site to the receiver funnel body, and a charging area configured to transfer energy from a power supply to the drone; and a parcel pod comprising a drone interface area, wherein the drone interface area of the parcel pod comprises a payload capture system that is configured to receive the payload from the drone, wherein the payload capture system comprises a receiver funnel body disposed on an exterior space of the parcel pod and a pneumatic tube system coupled with the payload capture system that conveys the payload from the receiver funnel body to a payload sort area of the parcel pod, and wherein the parcel pod further comprises a plurality of payload lockers and a gantry robot adapted to receive the payload from the payload sort area to a payload locker of the plurality of payload lockers.

11. The delivery network of claim 10, further comprising a central flight server that communicates wirelessly with the drone and automatically directs a delivery of the payload by the drone from the host site to at least one target site that is remotely located apart from the host site.

12. The delivery network of claim 11, wherein the target site comprises a drone interface area, the drone interface area of the target site comprising:

a payload capture system that is configured to receive the payload from the payload receptacle of the drone, wherein the payload capture system comprises a receiver funnel body disposed on an exterior space of the target site; and a pneumatic tube system coupled with the payload capture system that conveys the payload from the receiver funnel body to a payload discharge area of the target site.

13. The delivery network of claim 12, wherein the payload discharge area is in an interior space of the target site.

14. The delivery network of claim 13, wherein the payload discharge area is on the exterior space of the target site.

15. The delivery network of claim 11, wherein the target site comprises a location of emergency medical services personnel.

16. A delivery network comprising:

a host site comprising a drone interface area;

a parcel pod comprising a drone interface area;

a drone comprising a payload receptacle that is configured to receive a payload from the drone interface area of the host site, hold the payload during flight, and discharge the payload to the drone interface area of the parcel pod; and a central flight server that communicates wirelessly with the drone and automatically directs a delivery of the payload by the drone from the host site the parcel pod, wherein the drone interface area of the parcel pod comprises a payload capture system that is configured to receive the payload from the drone, wherein the payload capture system comprises a receiver funnel body disposed on an exterior space of the parcel pod and a pneumatic tube system coupled with the payload capture system that conveys the payload from the receiver funnel body to a payload sort area of the parcel pod, and wherein the parcel pod further comprises a plurality of payload lockers and a gantry robot adapted to receive the payload from the payload sort area to a payload locker of the plurality of payload lockers.

17. The delivery network of claim 16, further comprising:

a last mile delivery robot comprising a payload storage area; and a gantry robot adapted to receive the payload from the payload sort area to the payload compartment of the last mile delivery robot.

18. The delivery network of claim 16, wherein the parcel pod is solar powered.

* * * * *